(12) United States Patent
Reser et al.

(10) Patent No.: US 6,607,114 B2
(45) Date of Patent: Aug. 19, 2003

(54) WELD FIXTURE AND METHOD FOR REPAIRING ANNULAR COMPONENTS

(75) Inventors: David T. Reser, Trenton, OH (US); Robert Dale Lawrence, Hammersville, OH (US); Michael Paul Cook, West Chester, OH (US); Larry Dean Brock, Warsaw, KY (US); David John Dietz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/976,561

(22) Filed: Oct. 12, 2001

(65) Prior Publication Data

US 2003/0071108 A1 Apr. 17, 2003

(51) Int. Cl.$^7$ ............................................. B23K 37/04
(52) U.S. Cl. ..................... 228/49.1; 228/44.3; 228/49.4; 228/48
(58) Field of Search ............................. 228/119, 234.1, 228/44.3, 48, 49.1, 250, 252, 219, 212, 213, 245, 246, 218, 264, 49.4

(56) References Cited

U.S. PATENT DOCUMENTS

| | | | | |
|---|---|---|---|---|
| 4,092,018 A | * | 5/1978 | Schlosser et al. | 269/234 |
| 4,289,950 A | * | 9/1981 | Griebeler | 219/124.34 |
| 4,501,949 A | * | 2/1985 | Antol et al. | 219/121.63 |
| 5,205,465 A | | 4/1993 | Bogard et al. | 228/119 |
| 5,400,491 A | | 3/1995 | Yaworsky et al. | 29/33 R |
| 5,499,755 A | | 3/1996 | Myers et al. | 228/44.3 |
| 5,669,547 A | | 9/1997 | Spring | 228/219 |
| 6,083,333 A | * | 7/2000 | Van Beers et al. | 156/73.1 |

FOREIGN PATENT DOCUMENTS

GB  2663233 A  * 7/1993

* cited by examiner

Primary Examiner—M. Alexandra Elve
Assistant Examiner—Len Tran
(74) Attorney, Agent, or Firm—David L. Narciso; Pierce Atwood

(57) ABSTRACT

A multifunctional weld fixture is provided having a base receiving a component and a plurality of locator tabs disposed around its outer edge. A circumferential array of expansion feet are movably attached to the top surface of the base. A disk-shaped wedge is disposed in sliding engagement with the expansion feet. A cover supports a portion of the component and seals against the component to create an enclosed plenum. The same fixture may be used to expand the component to compensate for shrinkage after the weld is compete.

15 Claims, 4 Drawing Sheets

WELD FIXTURE AND METHOD FOR REPAIRING ANNULAR COMPONENTS

BACKGROUND OF THE INVENTION

This invention relates generally to the repair of gas turbine engines and more particularly to the repair of stationary seals used in such engines.

Gas turbine engines have numerous air seals intended to control the flow of air between various engine components. One common type of seal comprises an arcuate support member which carries a stationary sealing member, for example an abradable or honeycomb material, which is disposed in close proximity to circumferential seal teeth on a rotating member to create a tortuous flowpath, reducing air leakage past the seal. If the radial clearance between the parts of the seal should be reduced, for example in the case of transient engine operating conditions, the seal teeth can abrade or cut into the sealing member without generating excessive heat or wear in the seal teeth. Thus, the stationary portion of the seal is sacrificial.

In the interests of economy these types of seals are repaired when the stationary sealing member is excessively worn or damaged. The seals are typically repaired by cutting away a portion of the support member to which the sealing member is attached and welding a replacement portion of the support member to the remaining portion. A new sealing member can then be attached to the repaired support member.

Unfortunately, the required cutting operation can cause the support members, which are relatively thin cylindrical or band-shaped structures, to become distorted; for example the support member itself may go out-of-round, or a mounting flange that is part of the support member, which should be flat, may warp. The various prior art methods used to correct the distortion of the support member prior to welding can lead to cracking and local distortion of the support member. Also, in order to avoid contamination of the welds the support member is typically sealed with a heat resistant tape to contain an inert gas blanket. Applying this tape is time consuming and the tape does not always adequately protect the joint. Furthermore, the support member experiences diametrical shrinkage as a result of the welding process which must be corrected by expanding the support member in a subsequent operation. This typically requires a second piece of equipment in addition to the fixture used to hold the support member while it is welded.

Accordingly, there is a need for a method of repairing annular components with reduced distortion of the component and consistent weld quality. In particular, there is a need for a fixture that will facilitate such repair of annular components

BRIEF SUMMARY OF THE INVENTION

The above-mentioned need is met by the present invention, which provides a multifunctional weld fixture having a base for receiving a component and a plurality of locator tabs disposed around its outer edge. A circumferential array of expansion feet are movably attached to the top surface of the base. A disk-shaped wedge is disposed in sliding engagement with the expansion feet. A cover supports a portion of the component and seals against the component to create an enclosed plenum. The same fixture may be used to expand the component to compensate for shrinkage after the weld is compete.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
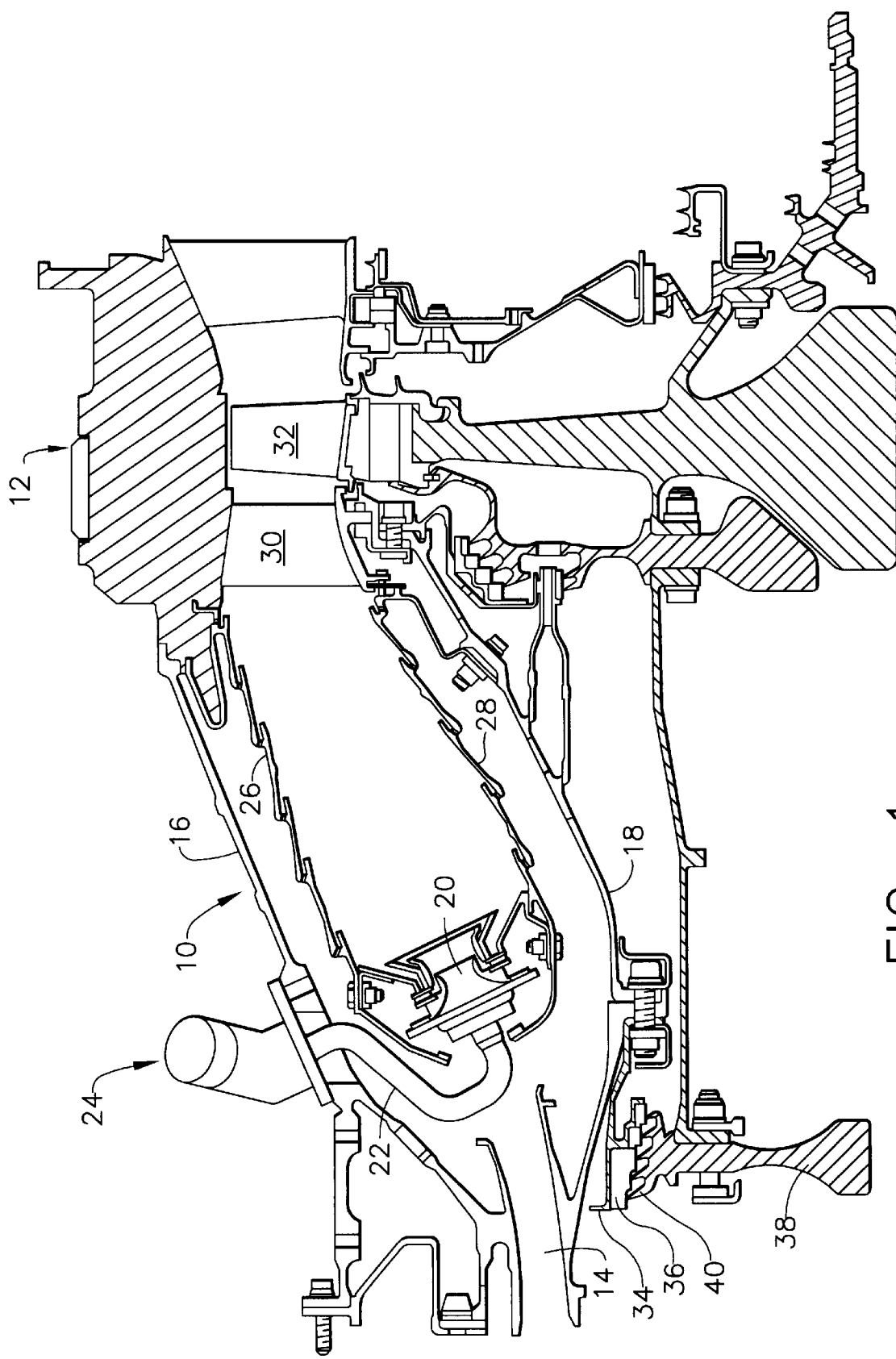
FIG. 1 is a cross-sectional view of combustor and high pressure turbine section of a representative gas turbine engine.

Referring to the drawings wherein identical reference numerals denote the same elements throughout the various views, FIG. 1 illustrates the combustor 10 and high pressure turbine 12 of a representative gas turbine engine. Compressed air from a compressor (not shown) is introduced through a diffuser 14 into an annular cavity defined by the outer combustor case 16 and the inner combustor case 18. A portion of the compressed air passes through a swirl nozzle 20, where it is mixed with fuel supplied through a fuel tube 22. The swirl nozzle and fuel tube are components of the fuel nozzle system 24. The flame is confined and directed downstream by the outer combustor liner 26 and the inner combustor liner 28. The hot gases then leave the combustor 10 and enter the high pressure turbine 12, which comprises one or more stages of stationary nozzles 30 alternated with rotating blades 32. A seal assembly 34, referred to as a forward inner seal or a compressor discharge pressure (CDP) seal, is attached to the inner combustor case 18 near its forward end. the seal assembly 34 carries a stationary seal member 36 which is disposed in close proximity to a rotating seal disk 38 which has a plurality of circumferential seal teeth 40 on its radially outer surface. The sealing member 36 and the seal teeth 40 cooperate to create a tortuous flowpath, the purpose of which is to prevent compressor discharge air from bypassing the combustor flowpath.

Figure 2:
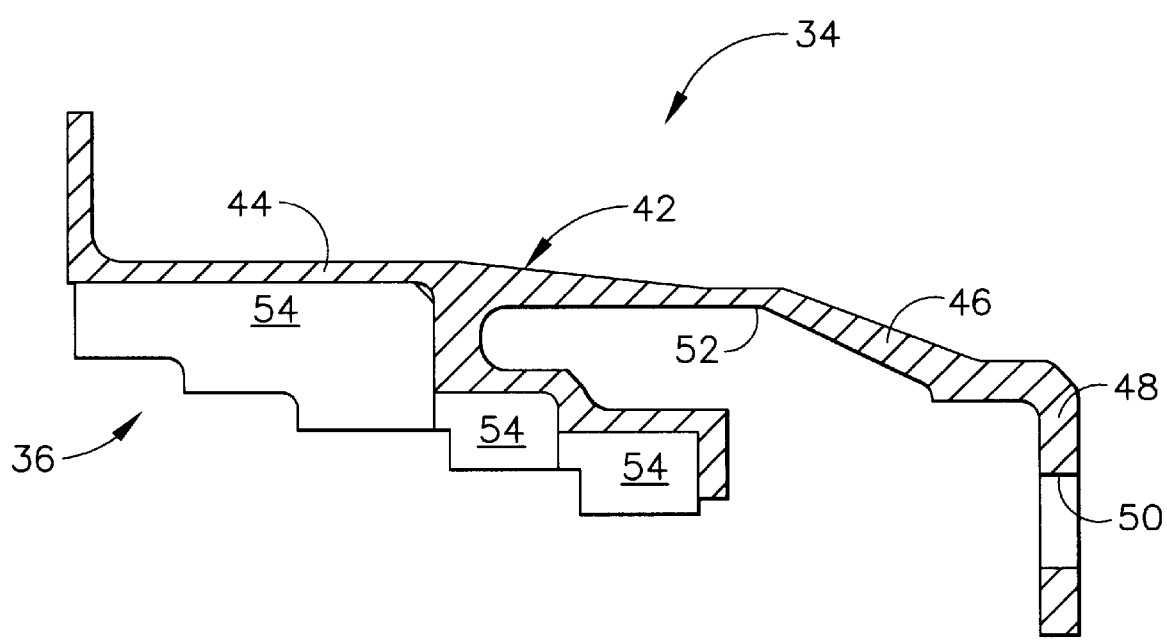
FIG. 2 is a compressor discharge pressure seal assembly for use in a gas turbine engine.

FIG. 2 illustrates the seal assembly 34 in more detail. The seal assembly 34 has an arcuate metallic support member 42. the support member 42 has an axially forward section 44, sometimes referred to as a backing strip. An arcuate sealing member 36 is disposed on the radially inner surface of the forward section 44. The seal member 36 may comprise a number of individual segments 54. The sealing member 36 is intended to allow the seal teeth 40 to penetrate or abrade it if necessary, for example during transient operating conditions, without damaging the seal teeth 40. A typical material for the sealing member 36 is a cellular sheet metal honeycomb structure which is brazed to the forward section 44. An axially aft section 46 has a circumferential flange 48 which has one or more bolt holes 50 formed therein for mounting the support member 42.

When the sealing member 36 of the seal assembly 34 is no longer serviceable because of rubs or other damage, the sealing member 36 and forward section 44 may be replaced while salvaging the aft section 46 of the support member 42.

This is accomplished by cutting the seal support member 42 apart at a joint 52, and welding a new forward section 44 to the aft section 46. A new sealing member 36 is then brazed in place. When the old part is removed, it is often found that the locating diameter for the weld at the joint 52 is out of round and that the locating face of the flange 48 is not flat, causing mismatch problems at the joint 52 between the remaining aft section 46 and the new replacement forward section 44. These defects require correction, for example by cold working, which tends to cause cracks in the aft section 46. Furthermore, the weld joint is typically protected from contamination by sealing the support member 42 with heat resistant tape to contain an inert purge gas. The tape can be time consuming to apply and may become detached or leak, causing contamination of the weld.

Figure 3:
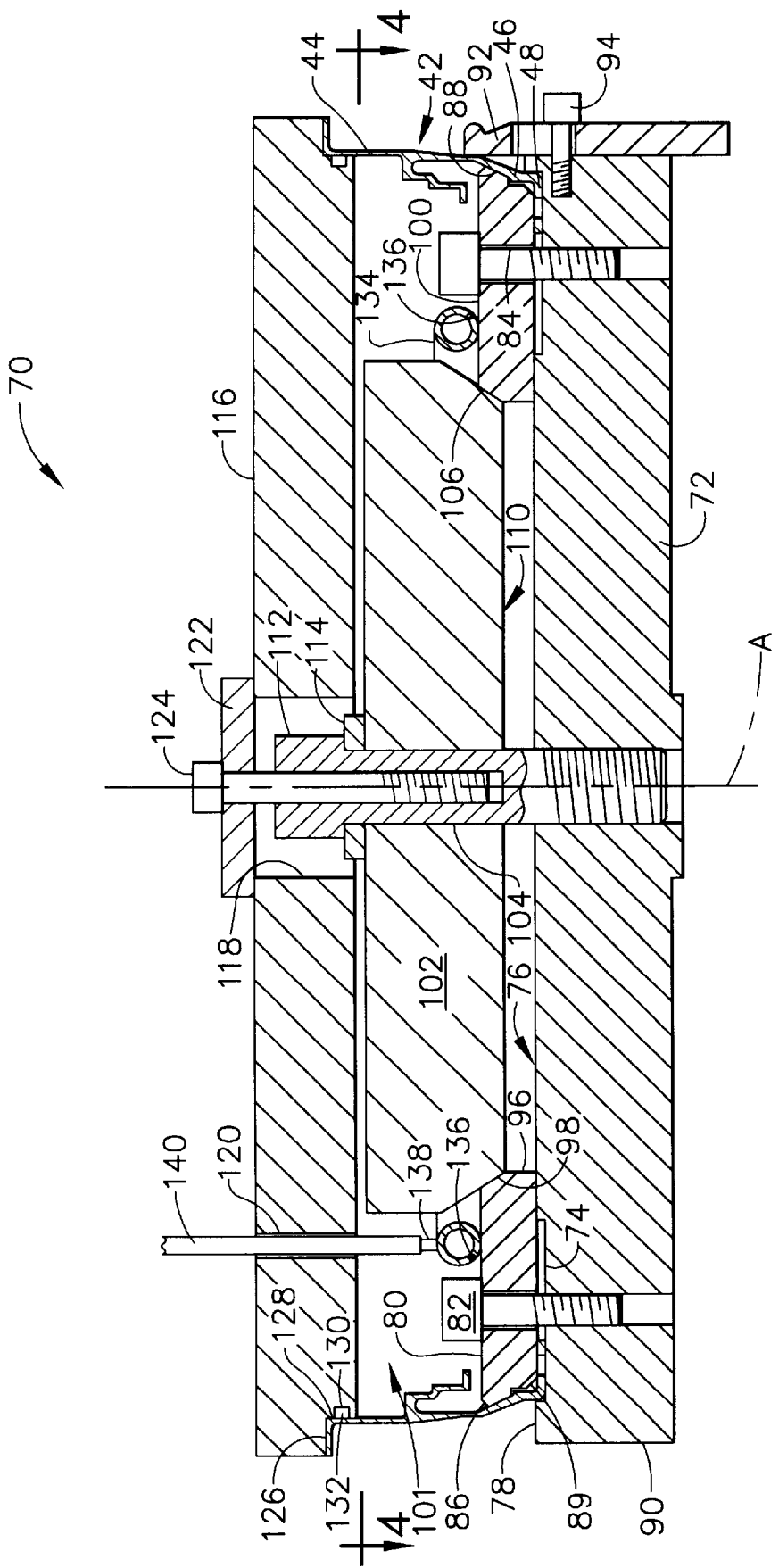
FIG. 3 is a cross-sectional view of a weld fixture in accordance with the present invention.
Figure 4:
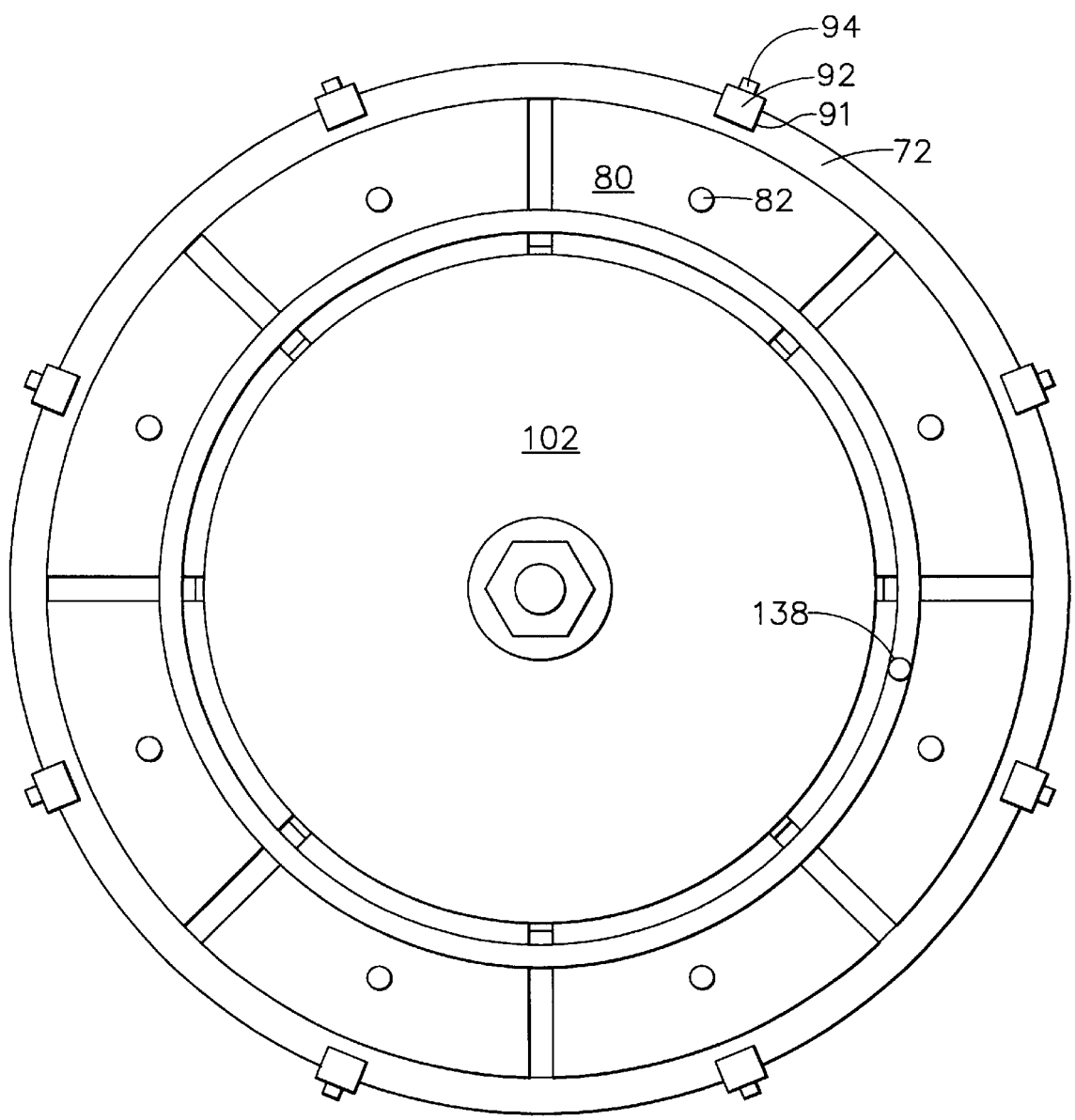
FIG. 4 is a view taken along lines 3—3 of FIG. 3.

Referring now to FIGS. 3 and 4, a welding fixture 70 in accordance with the present invention has a circular base 72 which is adapted to be mounted on a mechanism (not shown) for rotating the fixture 70 about its central axis A. The top surface 76 of the base 72 has a circumferentially extending groove 74 which receives the support member 42 during the welding and subsequent expansion operations. A rim 78 is disposed at the radially outer edge of the groove and serves to restrain the flange 48 of the support member 42 in the radial direction. A plurality of expansion feet 80 are arranged on the top surface 76 of the base 72 so that they overlie the groove 74. The expansion feet 80 are secured to the base 72 by a plurality of retention bolts 82. The expansion feet 80 are free to move in a radial direction because the clearance holes 84 of the expansion feet 80 are larger than the shank of the retention bolts 82. Each expansion foot 80 has an arcuate outer edge 86. In the illustrated example the outer edge 86 of each expansion foot 80 defines a portion of a circle in plan view. The outer edges 86 each have an angled face 88 which is adapted to bear against the inner diameter of support member 42. An annular recess 89 is formed on the underside of the outer edge of each expansion foot 80 so that the angled face 88 can extend radially to contact the support member 42 at the proper axial location in order to expand the support member 42 after welding is completed. Each expansion foot 80 also has an inner edge 96 which may define a portion of a circle and which has a beveled face 98 adjacent the upper surface 100 of the expansion foot 80.

The outer edge 90 of the base 72 has a circumferential array of axially-extending slots 91 formed therein. The slots 91 receive locator tabs 92 which are secured to the outer edge of the base 72 by cap screws 94. the locator tabs 92 may be standard clamp straps which are available in the metal working industry. The locator tabs 92 extend axially above the top surface 76 of the base 72. A disk shaped wedge 102 has a central hole 104 and a circumferentially extending beveled surface 106 adjacent its bottom surface 110. In using the fixture 70, the wedge 102 is placed on top of the expansion feet 80 and coaxial to the base 72 so that the beveled surface 106 of the wedge 102 engages the beveled faces 98 of the expansion feet 80 in sliding contact. Although the illustrated example shows each expansion foot 80 having a beveled face 98 and the wedge 102 having a beveled surface 106, it should be noted that other shapes are possible for the mating portions of the wedge 102 and the expansion feet 80, so long as they are shaped so that axial movement of the wedge 102 causes radial movement of the expansion feet 80. For example, the wedge 102 may have a beveled surface 106 while the expansion feet have an inner edge 96 that is a square corner in cross-section, or the arrangement could be reversed. The wedge 102 is secured to the base 72 by a clamp bolt 112 and a washer 114. A disk-shaped cover 116 having a central hole 118 and a inlet port 120 is disposed over the base 72. The cover 116 is secured to the base 72 by a washer 122 and a bolt 124 which is screwed into a threaded hole in the clamp bolt 112. When the cover 116 is installed it cooperates with the base 72 and the support member 42 to form an enclosed plenum 101. The lower outside edge of the cover 116 has a circumferentially extending notch 126 formed therein. The notch 126 has a radially outward facing seal surface 128. A circumferential groove 130 in the seal surface 128 accepts a gas seal 132, for example an O-ring seal. An annular atmosphere tube 134 having a plurality of exit holes 136 around its outer periphery is disposed on top of the expansion feet 80. The atmosphere tube 134 is connected to a gas supply tube 140 by a connector 138.

To repair a seal assembly 34 using the fixture 72, a used seal assembly 34 is cut at the joint 52 and the forward section 44 is discarded. The aft section 46 is prepared for being joined to a replacement forward section 44 by grinding a bevel on the edge of the aft section 46 adjacent the joint, to ensure full weld penetration. The aft section 46 is then placed in the groove 74 of the base 72 and the expansion feet are placed over the flange 48 of the aft section 46. The locator tabs 92 are then installed. The wedge 102 is then installed and the clamp bolt 112 is slightly tightened to force the expansion feet 80 radially outward against the aft section 46. The retention bolts 82 are then tightened. This ensures the flatness of the flange 48 and also provides firm contact between the flange 48 and the expansion foot 80 so that the expansion foot 80 may act as a sink to draw excess heat from the support member 42 during the welding process. The aft section 46 is restrained radially between the outer edges 86 of the expansion feet 80 and the rim 78 of the base 72. The replacement forward section 44 is then placed on the fixture 70, where it is held in position and constrained in the proper circular shape by the protruding portions of the locator tabs 92. Next the atmosphere tube 134 is placed in position. The cover 116 is then installed so that gas seal 132 seals against the forward section 44 and secured with the cover washer 122 and the cover bolt 124. The seal surface 128 of the cover helps maintain the roundness of the forward section 44 as well as closing off the cavity 101. The atmosphere tube 134 is then connected with the gas supply tube 140 and the cavity 101 is purged with an inert gas, such as argon, to prevent defects in the welds. The presence of the atmosphere tube 134 has been found to be more effective at providing a blanket of inert gas to the backside of the joint 52, and thus preventing weld defects, than simply introducing the gas into the cavity 101 through a single inlet. The forward and aft sections are then tack welded together in several places around the circumference of the joint 52. After tack welding is complete the locator tabs 92 are moved (or removed) to allow full access to the joint 52. The joint 52 is then fully welded, for example by a known automatic or semi-automatic welding process such as a dabber TIG welding process. The welding torch (not shown) is held stationary while the weld fixture 70 rotates to expose the entire joint 52 to the torch. This allows for consistent control of welding parameters. After the weld is complete any shrinkage of the support member 42 is corrected by expanding the support member 42 with the expansion feet 80. The expansion may be performed by tightening the clamp bolt 112, driving the expansion feet 80 radially outward. It may also be desirable to perform the expansion by placing the weld fixture 70, without the cover 116, into a hydraulic press and applying pressure to the wedge 102. After the support member 42 has been suitably expanded, the joint 52 is machined to the correct dimensions. The support member 42 is then ready to have a new seal member 36 attached to the replacement forward section 44.

While the exemplary embodiment of the weld fixture and repair process described herein is for an arcuate compressor discharge seal, the present invention is equally applicable to the repair of other similar components that require accurate positioning for weld operations, for example forward outer seals in gas turbine engines.

The foregoing has described an multifunctional weld fixture and a method for repairing gas turbine engine components. While specific embodiments of the present invention have been described, it will be apparent to those skilled in the art that various modifications thereto can be made without departing from the spirit and scope of the invention as defined in the appended claims.

What is claimed is:

1. A weld fixture comprising:
    a base having a top surface, a central axis and an outer edge;
    a plurality of axially-extending locator tabs removably attached to said outer edge, said tabs extending axially past said top surface;
    a plurality of expansion feet movably attached to said top surface of said base plate and arranged in an annular array, wherein said expansion feet can move in a radial direction;
    a generally disk-shaped wedge having a central axis and disposed adjacent said top surface of said base and coaxial to said base so that said wedge is disposed in contact with each of said expansion feet;
    means for clamping said wedge and said base in an axial direction;
    a cover disposed above said wedge, said cover having an outer surface;
    a gas seal disposed in said outer surface; and
    means for clamping said cover and said base in an axial direction.

2. The weld fixture of claim 1 further comprising an annular atmosphere tube disposed above said base and below said cover, said atmosphere tube having at least one exit hole and at least one inlet for connecting said atmosphere tube in fluid communication with a gas supply tube.

3. The weld fixture of claim 1 wherein each of said expansion feet has an arcuate outer edge.

4. The weld fixture of claim 1 wherein each of said expansion feet has an inner edge which includes a beveled face adjacent an upper surface of said expansion foot.

5. The weld fixture of claim 1 wherein said wedge has a circumferentially extending beveled surface disposed adjacent its lower surface.

6. The weld fixture of claim 5 wherein each of said expansion feet has an inner edge which includes a beveled face adjacent an upper surface of said expansion foot.

7. The weld fixture of claim 1 wherein said cover has a circumferentially extending notch disposed in its lower edge and said outer surface forms a portion of said notch.

8. The weld fixture of claim 1 wherein an annular groove is formed in said top surface of said base.

9. A weld fixture comprising:
    a base having a top surface, a central axis and an outer edge;
    a plurality of axially-extending locator tabs removably attached to said outer edge, said tabs extending axially past said top surface;
    a plurality of expansion feet movably attached to said top surface of said base and arranged in an annular array, each of said expansion feet having an arcuate outer edge, wherein said expansion feet can move in a radial direction;
    a generally disk-shaped wedge having a central axis, said wedge disposed adjacent said top surface of said base and coaxial to said base so that said wedge is disposed in contact with said expansion feet;
    means for clamping said wedge and said base in an axial direction;
    a generally disk-shaped cover disposed above said wedge, said cover having a radially outwardly facing surface;
    a circumferentially extending gas seal disposed in said radially outwardly facing surface;
    an annular atmosphere tube surrounding said wedge and disposed above said expansion feet and below said cover, said atmosphere tube having at least one exit hole and at least one inlet for connecting said atmosphere tube in fluid communication with a gas supply tube; and
    means for clamping said cover and said base in an axial direction.

10. The weld fixture of claim 9 wherein each of said expansion feet has an inner edge which includes a beveled face adjacent an upper surface of said expansion foot.

11. The weld fixture of claim 9 wherein said wedge has a circumferentially extending beveled surface disposed adjacent its lower surface.

12. The weld fixture of claim 11 wherein each of said expansion feet has an inner edge which includes a beveled face adjacent an upper surface of said expansion foot.

13. The weld fixture of claim 9 wherein said generally disk-shaped cover has a circumferentially extending notch disposed in its lower edge and said radially outwardly facing surface forms a portion of said notch.

14. The weld fixture of claim 9 wherein said atmosphere tube has a plurality of exit holes disposed around its circumference.

15. The weld fixture of claim 9 wherein an annular groove is formed in said top surface of said base.

* * * * *